(12) United States Patent
Lin et al.

(10) Patent No.: US 9,944,530 B2
(45) Date of Patent: Apr. 17, 2018

(54) GRAPHENE PLATELET FABRICATION METHOD AND GRAPHENE PLATELET FABRICATED THEREBY

(71) Applicant: RITEDIA CORPORATION, Hsinchu County (TW)

(72) Inventors: I-Chiao Lin, Taipei (TW); Hung-Cheng Lin, New Taipei (TW)

(73) Assignee: Ritedia Corporation, Hukou Township, Hsinchu County (TW)

( * ) Notice: Subject to any disclaimer, the term of this patent is extended or adjusted under 35 U.S.C. 154(b) by 1161 days.

(21) Appl. No.: 14/026,441

(22) Filed: Sep. 13, 2013

(65) Prior Publication Data

US 2014/0106153 A1 Apr. 17, 2014

(30) Foreign Application Priority Data

Oct. 16, 2012 (TW) .............................. 101138046 A

(51) Int. Cl.
| | |
|---|---|
| *B32B 9/00* | (2006.01) |
| *C01B 31/04* | (2006.01) |
| *B82Y 30/00* | (2011.01) |
| *B82Y 40/00* | (2011.01) |
| *C01B 32/19* | (2017.01) |
| *C01B 32/194* | (2017.01) |

(52) U.S. Cl.
CPC .......... *C01B 31/0484* (2013.01); *B82Y 30/00* (2013.01); *B82Y 40/00* (2013.01); *C01B 32/19* (2017.08); *C01B 32/194* (2017.08); *C01B 2204/02* (2013.01); *C01B 2204/04* (2013.01); *C01B 2204/32* (2013.01); *Y10T 156/11* (2015.01); *Y10T 156/1121* (2015.01); *Y10T 156/1126* (2015.01)

(58) Field of Classification Search
CPC ............................. C01B 31/0438; C01B 31/04
USPC ........................................... 428/408; 423/448
See application file for complete search history.

(56) References Cited

U.S. PATENT DOCUMENTS

| 2003/0047519 A1* | 3/2003 | Yamada | B02C 19/18 210/748.05 |
| 2009/0155578 A1* | 6/2009 | Zhamu | B82Y 30/00 428/336 |

FOREIGN PATENT DOCUMENTS

| TW | 201022142 | 6/2010 |
| TW | 201131019 | 9/2011 |

* cited by examiner

*Primary Examiner* — Daniel H Miller
(74) *Attorney, Agent, or Firm* — Muncy, Geissler, Olds & Lowe, P.C.

(57) ABSTRACT

The present invention discloses a graphene platelet fabrication method, which comprises Step (A): providing a highly-graphitized graphene having a graphitization degree of 0.8-1.0; and Step (B): providing a shear force acting on the highly-graphitized graphene to separate the highly-graphitized graphene into graphene platelets, wherein the graphene platelets have a length of 10-500 μm and a width of 10-500 μm and have a single-layer or multi-layer structure. The present invention also discloses a graphene platelet fabricated according to the abovementioned method.

14 Claims, 8 Drawing Sheets

GRAPHENE PLATELET FABRICATION METHOD AND GRAPHENE PLATELET FABRICATED THEREBY

FIELD OF THE INVENTION

The present invention relates to a graphene platelet fabrication method and a graphene platelet fabricated thereby, particularly to a large-area graphene platelet fabrication method and a large-area graphene platelet fabricated thereby.

BACKGROUND OF THE INVENTION

Graphene is a one-atom thick planar sheet of $sp^2$-bonded carbon atoms. Theoretically, graphenes having a perfect hexagonal network structure can be densely stacked to form a layered structure exhibiting superior stability and superior thermal conductivity in electronics. Owing to the superior physical properties, graphene can be widely applied to various devices, promoting the performance of electric conduction, thermal conduction, or strength of the devices. However, the related industry has not yet been able to efficiently mass-fabricate highly-graphitized graphene since physicists separated graphene from graphite at the beginning of the new millennium. The conventional graphene mass-fabrication technology uses high temperature and high pressure to rearrange carbon atoms of graphite into a planar hexagonal network structure. However, the conventional technology is hard to achieve a greater extension in the planar direction ($L_a$) of the hexagonal network structure of graphene. Further, the hexagonal network structure is normally imperfect. Thus, the interplanar distance ($d_{(0002)}$) between the graphene planes is much larger than the theoretical value. Consequently, the physical properties of the graphene fabricated by the conventional technology are unlikely to meet expectations.

The Inventors had disclosed methods for fabricating highly-graphitized graphene platelets in Taiwan patents No. 201022142 and No. 201131019, wherein high-purity graphite is catalyzed by a metal catalyst to rearrange carbon atoms into a perfect planar hexagonal network structure, whereby is obtain a highly-graphitized graphene platelet. However, the abovementioned methods are unlikely to mass-fabricate commercial graphene platelets. In practical applications, what various electronic devices need are the physical properties of graphene platelets. It should be a preference that the mass-fabricated highly-graphitized graphene is separated into single-layer or multi-layer graphene platelets before their application. In the conventional technologies, graphite is normally separated into a plurality of single-layer or multi-layer graphene platelets in an explosion method or a chemical-exfoliation method. However, the abovementioned conventional technologies would damage the planar hexagonal network structure of graphene platelets and degrade the physical properties thereof. Therefore, the conventional technologies cannot fabricate large-area graphene platelets having a perfect planar hexagonal network structure, not to mention fabricating them in high efficiency.

Accordingly, the field concerned is eager to develop a method for fabricating a large-area graphene platelet having a perfect planar hexagonal network structure to facilitate the application of graphene and the growth of the related industry.

SUMMARY OF THE INVENTION

The primary objective of the present invention is to provide a graphene platelet fabrication method, which uses a shear force to separate highly-graphitized graphene into graphene platelets without damaging the planar hexagonal network structure of the graphene platelets.

To achieve the abovementioned objective, the present invention proposes a graphene platelet fabrication method, which comprises Step (A): providing a highly-graphitized graphene having a graphitization degree of 0.8-1.0; Step (B): providing a shear force acting on the highly-graphitized graphene to separate the highly-graphitized graphene into a plurality of graphene platelets, wherein the graphene platelet is 10-500 μm wide and 10-500 μm long and has a single-layer structure or a multi-layer structure.

In one embodiment, the multi-layer structure has 2-50 layers of graphene planes.

In one embodiment, the shear force is a dry-type shear force or a wet-type shear force; the shear force is greater than the bonding force between graphene platelets so as to effectively separate the highly-graphitized graphene. In one embodiment, the dry-type shear force is realized by a mechanical force acting on the highly-graphitized graphene along the movement direction of the graphene platelets, whereby to separate the highly-graphitized graphene into graphene platelets. In one embodiment, the wet-type shear force is realized by a fluid action force applying to the highly-graphitized graphene opposite to the movement direction of the graphene platelets, whereby to separate the highly-graphitized graphene into graphene platelets. In one embodiment, the highly-graphitized graphene is placed on a fixing platform, and a pushing device applies a mechanical force to the surface or lateral of the highly-graphitized graphene. In one embodiment, the highly-graphitized graphene is dispersed in a fluid, and the fluid is passed through a circulation system having nozzles, whereby the fluid applies a force to the surface or lateral of the highly-graphitized graphene. In one embodiment, the fluid applies a force to the lateral of the highly-graphitized graphene.

The above statement does not describe the force that the fixing platform acts on the highly-graphitized graphene in details. In fact, the present invention does not particularly limit the type of the fixing platform. The persons skilled in the art can arbitrarily select a fixing platform as long as the force that the fixing platform acts on the highly-graphitized graphene is greater than the Van der Waals bonding force of the graphene platelets. Thus, the pushing device will only push the portion of highly-graphitized graphene, which does not contact the fixing platform. Thereby, the dry-type shear force can separate the highly-graphitized graphene.

In one embodiment, the fluid containing the highly-graphitized graphene is circulated in the nozzle-containing circulation system repeatedly, whereby the graphene platelets are effectively separated. The present invention does not particularly limit the number of circulation cycles as long as the number of circulation cycles is sufficient to make the multi-layer structure of the resultant graphene platelets have the desired layers: For example, the number of circulation cycles may range from 1 to 900, preferably from 50 to 500, more preferably from 100 to 200. The present invention does not particularly limit the intensity of the shear force generated by the circulation system as long as the shear force does not damage the planar hexagonal network structure of graphene. In one embodiment, the shear force that the circulation system acts on the highly-graphitized graphene ranges from 1 to 500 MPa, preferably from 10 to 500 MPa, more preferably from 50 to 200 MPa. In one embodiment, the fluid containing the highly-graphitized graphene is circulated in the circulation system for 200 cycles, and the shear force that the circulation system acts on the highly-graphitized graphene is 200 MPa, whereby is achieved the optimized separation effect.

In one embodiment, in order to separate the highly-graphitized graphene more efficiently, elbows are arranged before the nozzles, whereby to make the fluid action force act on the lateral side of the highly-graphitized graphene and separate the highly-graphitized graphene. In one embodiment, the elbows have an angle of 30-150 degrees, whereby to make the fluid action force act on the lateral side of the highly-graphitized graphene and separate the highly-graphitized graphene.

In order to prevent the dispersed graphene platelets from thermally-induced agglomeration, the fluid containing the highly-graphitized graphene is maintained at a temperature of 25-100° C. during the entire fabrication process. The present invention does not particularly limit the method of controlling the fluid temperature. Any available method in the field concerned can be used to control the fluid temperature in the present invention.

The present invention does not particularly limit the concentration of the highly-graphitized graphene in the fluid as long as the highly-graphitized graphene can be effectively separated by the force generated by the fluid. In one embodiment, the concentration of the highly-graphitized graphene ranges from 0.5 to 50 wt %. In one embodiment, the concentration of the highly-graphitized graphene is 1.0 wt %. Besides, the present invention does not particularly limit the type of the fluid as long as the fluid can provide the action force required by the method of the present invention. For example, the fluid can be selected from a group consisting of water, NMP (N-Methyl Pyrrolidone), surfactants, salt solutions, and combinations thereof. In one embodiment, the fluid is NMP.

In one embodiment, in order to more effectively use the shear force to separate the highly-graphitized graphene into graphene platelets, the method of the present invention further comprises Step (A1) arranged before Step (A). In Step (A1), a pre-treatment is used to swell the highly-graphitized graphene and increase the interplanar distance ($d_{(0002)}$) of graphene planes, whereby the pre-treated highly-graphitized graphene can be more easily separated into graphene platelets. The present invention does not particularly limit the pre-treatment method as long as the pre-treatment method does not damage the planar hexagonal network structure of graphene platelets. For example, the pre-treatment method can be selected from a group consisting of the explosion method, the chemical exfoliation method, the ultrasonic method, the ball milling method, and combinations thereof. In one embodiment, the pre-treatment method is the explosion method.

Via the graphene platelet fabrication method of the present invention are achieved graphene platelets having a perfect planar hexagonal network structure.

The present invention also provides a graphene platelet, which has larger area and more perfect planar hexagonal network structure than the graphene platelet fabricated by the conventional technology.

To achieve the abovementioned objective, the present invention proposes a graphene platelet, which is fabricated by the abovementioned method of the present invention, and which is 10-500 μm in width and 10-500 μm in length and has a single-layer structure or a multi-layer structure.

In one embodiment, the multi-layer structure of the graphene platelet of the present invention has 2-50 layers of graphene planes.

In the specification, the term "graphitization degree" refers to the ratio of graphite in a material. Theoretically, the interplanar distance of graphene planes is 3.345 Å (angstrom). While the graphitization degree equals to 1, the graphenes are stacked most densely, and the interplanar distance ($d_{(0002)}$) of graphene planes is 3.345 Å. The graphitization degree (G) is calculated according to Equation 1:

$$G=(3.440-d_{(0002)})/(3.440-3.354) \tag{1}$$

The higher the graphitization degree, the lager the crystal size. The crystal size is determined by the planar extension (La) of the hexagonal network structure of graphene planes and the thickness (Lc) of the stacked graphene layers. The highly-graphitized graphene is normally referred to the graphene having a graphitization degree greater than or equal to 0.8.

In the specification, the term "shear force" refers to the action force macroscopically parallel to the graphene planes.

The present invention has been generally introduced above. The present invention will be described in further details to make more easily understood the technical contents, characteristics and advantages of the present invention in the following statement and claims.

DETAILED DESCRIPTION OF THE PREFERRED EMBODIMENTS

The primary technical characteristic of the present invention is to use a method distinct from the conventional technology to fast fabricate large-area graphene platelets having perfect planar hexagonal network structure. Below, the present invention will be described in details with embodiments.

Embodiment I

Figure 1A:
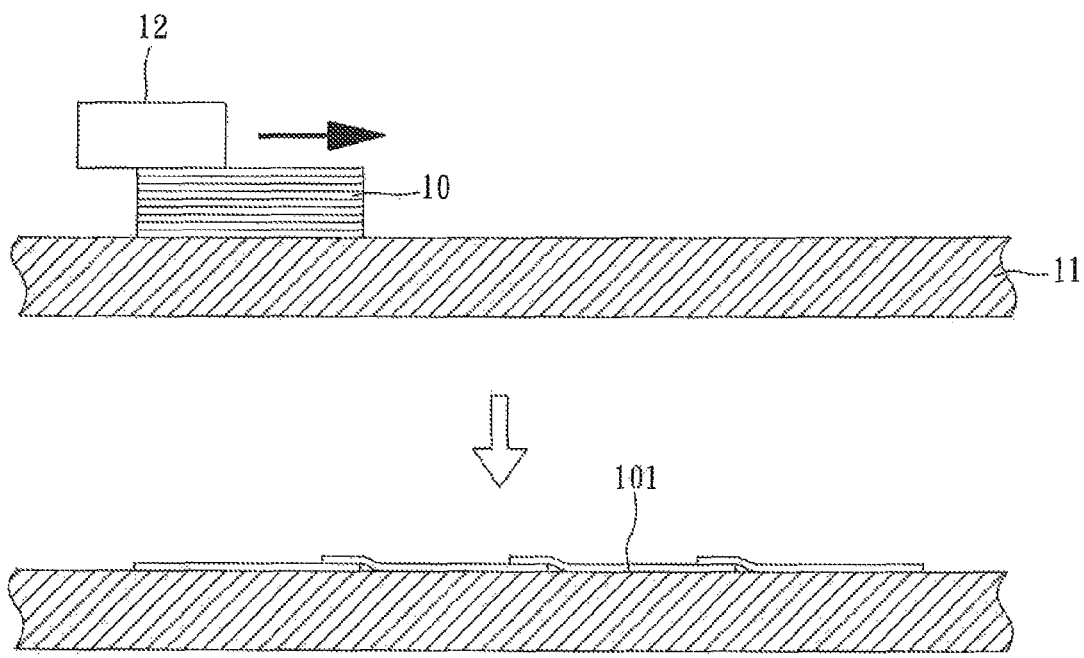
FIG. 1A and FIG. 1B respectively schematically show the processes of a graphene platelet fabrication method according to Embodiment I and Embodiment II of the present invention.

Embodiment I involves a method using a dry-type shear force to separate highly-graphitized graphene. Refer to FIG. 1A a diagram showing the process of a graphene platelet fabrication method according to Embodiment I of the present invention. Firstly, place a highly-graphitized graphene 10 on a fixing platform 11. Next, use a pushing device 12 to provide a dry-type shear force. In Embodiment I, the dry-type shear force acts on the surface of the highly-graphitized graphene 10, separating the highly-graphitized graphene 10 into graphene platelets 101. In Embodiment I, the highly-graphitized graphene 10 has a graphitization degree of 0.95 and is 100 μm in width and 100 μm in length. The shear force is a mechanical force generated by the pushing device 12.

The mechanical force is parallel to the movement direction of the graphene platelets 101 (as indicated by the arrow) and greater than the Van der Waals bonding force of the graphene platelets 101. Modifying the intensity of the mechanical force not only can separate the highly-graphitized graphene 10 but also can control the number of the layers of graphene planes of a graphene platelet 101. In Embodiment I, the obtained graphene platelet 101 has 2-5 layers of graphene planes. In Embodiment I, as the highly-graphitized graphene 10 has a pretty high graphitization degree, the obtained graphene platelets 101 have a width of 100 μm and a length of 100 μm and still have a perfect planar hexagonal network structure.

Embodiment II

Figure 1B:
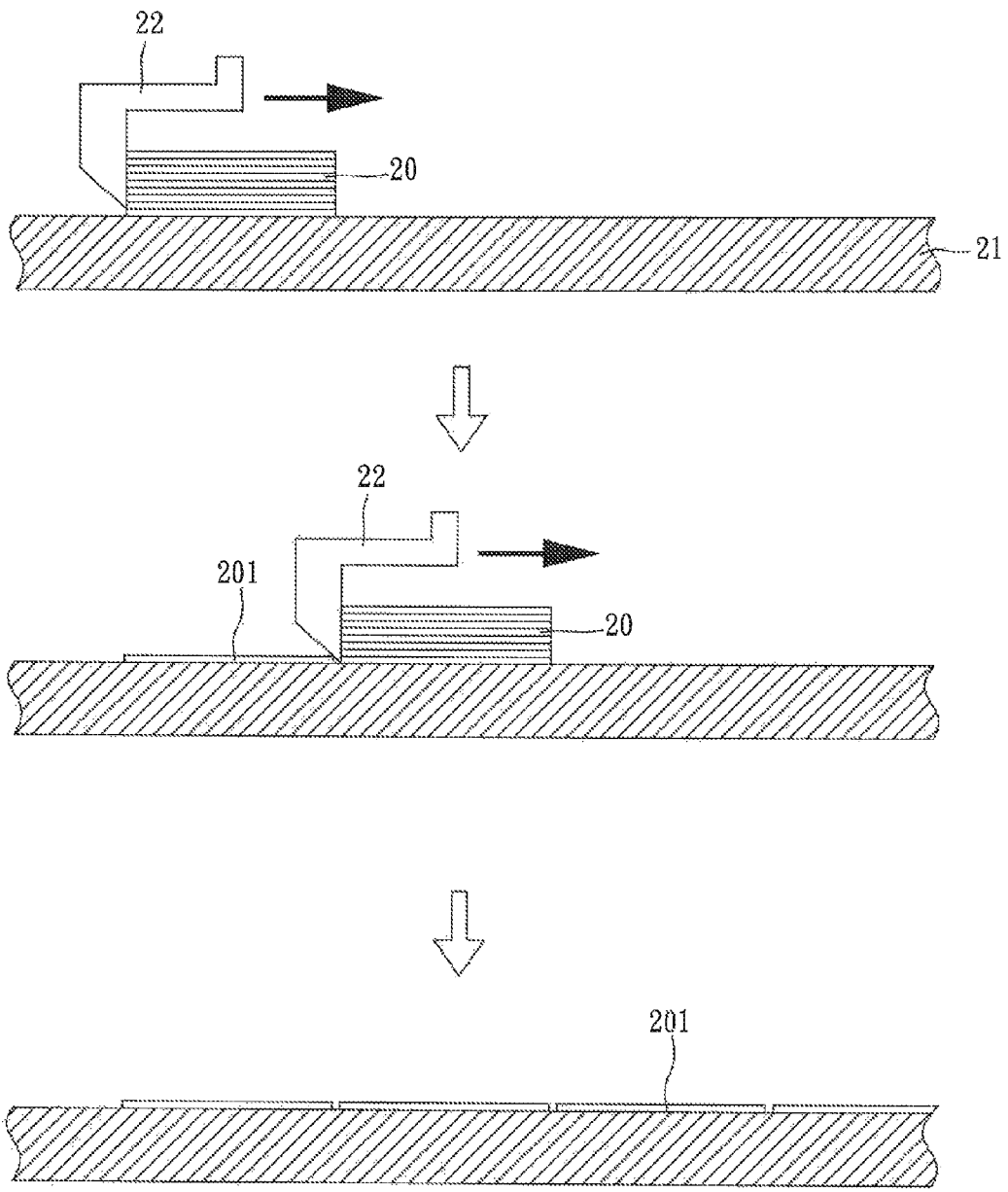

Embodiment II involves another method using a dry-type shear force to separate highly-graphitized graphene. Refer to FIG. 1B a diagram showing the process of a graphene platelet fabrication method according to Embodiment II of the present invention. In Embodiment II, it is similar to Embodiment I: a highly-graphitized graphene 20 is placed on a fixing platform 21, and a pushing device 22 is used to provide a dry-type shear force acting on the highly-graphitized graphene 20 for separating the highly-graphitized graphene 20 into graphene platelets 201. In Embodiment II, it is different from Embodiment I: the dry-type shear force generated by the pushing device 22 (the mechanical force indicated by the arrow) acts on the lateral side of the highly-graphitized graphene 20. In Embodiment II, the distance between the pushing device 22 and the fixing platform 21 is carefully adjusted to precisely control the number of the layers of graphene planes of the obtained graphene platelets 201. In Embodiment II, the obtained graphene platelet 201 has 2 layers of graphene planes. In Embodiment II, the obtained graphene platelets 201 also have a width of 100 μm and a length of 100 μm and also have a perfect planar hexagonal network structure.

Embodiment III

Figure 2:
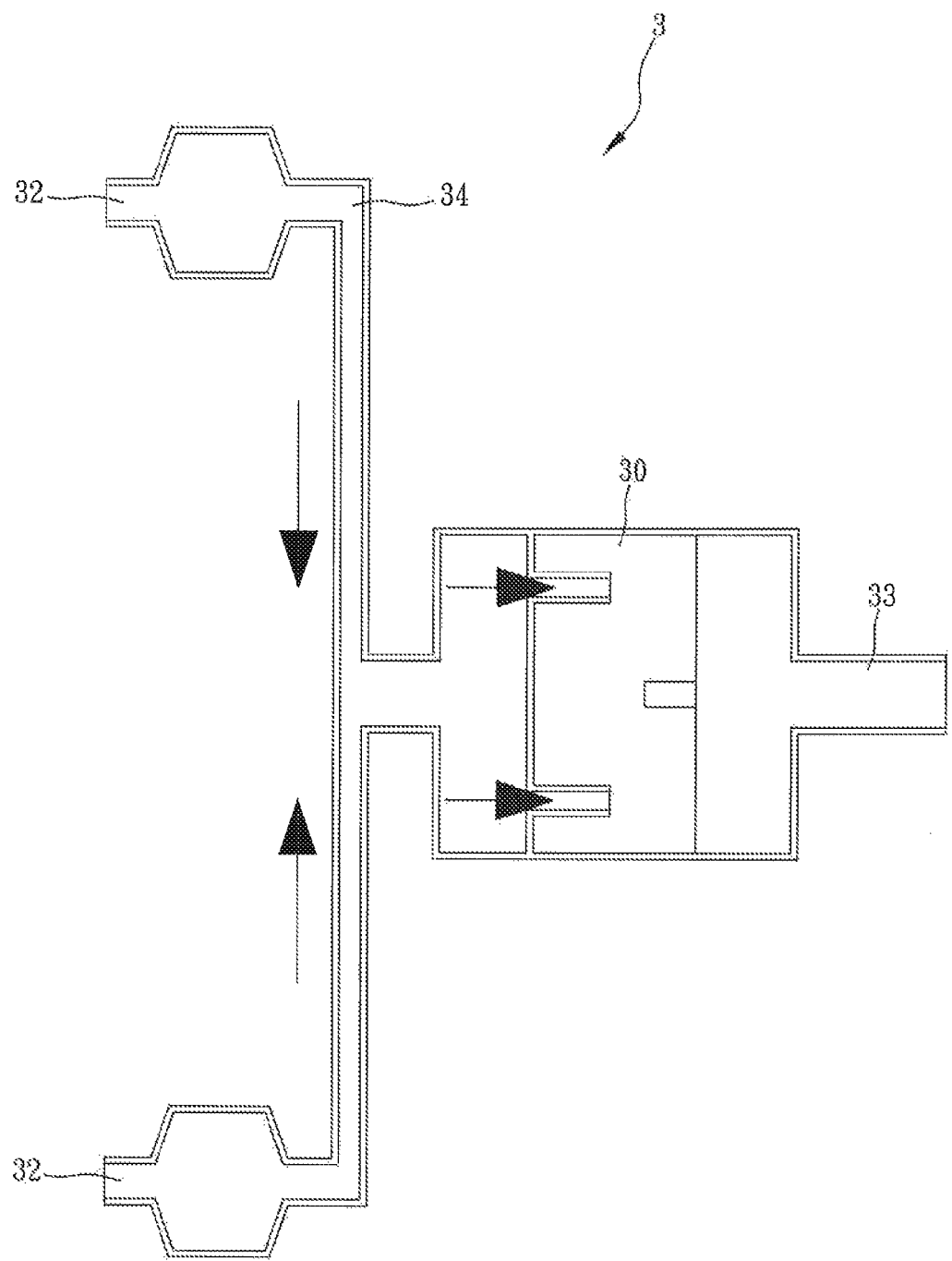
FIG. 2 schematically shows a device according to Embodiment III of the present invention.

In addition to using the dry-types shear forces introduced in Embodiments I and II, the present invention also uses a wet-type shear force to separate the highly-graphitized graphene, wherein the highly-graphitized graphene is mixed with a fluid, and the fluid is circulated in a circulation system containing nozzles. Refer to FIG. 2 showing a device according to Embodiment III. The circulation system 3 comprises two feeding ports 32 and a discharging port 33, wherein the discharging port 33 is connected with the feeding ports 32 (not shown in the drawing) for circulation of the fluid. In one embodiment, a pressurizing system (not shown in the drawing) is used to make the fluid flow through nozzles 30 where the fluid generates a fluid action force functioning as a wet-type shear force. The present invention does not particularly limit the type of the pressurizing system as long as the pressurizing system can make fluid generate the required fluid action force. In order to separate the highly-graphitized graphene more efficiently, elbows 34 are arranged before the nozzles 30, whereby the highly-graphitized graphene carried by the fluid will be turned by 90 degrees while passing through the elbows 34. Thus, the fluid action force will act on the lateral side of the highly-graphitized graphene and separate the highly-graphitized graphene.

The objective of Embodiment III is to separate the highly-graphitized graphene with a wet-type shear force, which is provided by the circulation system 3 shown in FIG. 2 and different from the dry-type shear forces. In Embodiment III, the highly-graphitized graphene has a graphitization degree of 0.95 and has a length of 100 μm and a width of 100 μm. In Embodiment III, the fluid is NMP (N-Methyl Pyrrolidone); the concentration of the highly-graphitized graphene is 1 wt %; the temperature of the fluid is between 25 and 35° C. during all the fabrication process.

Figure 3:
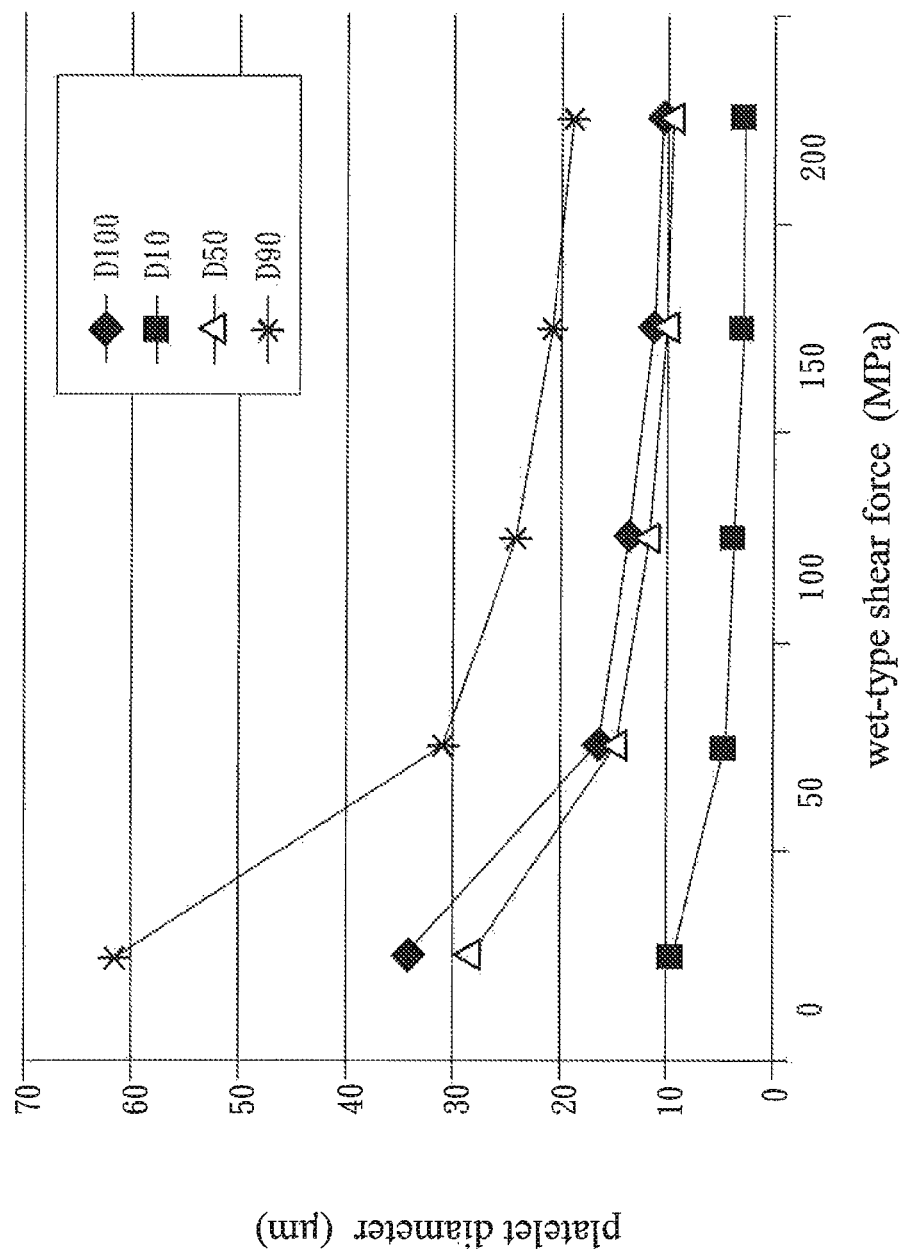
FIG. 3 shows the result of the analysis of the platelet diameters Embodiment III of the present invention.

Refer to FIG. 3 showing the relationships between the values of the shear force and the average platelet diameters of the graphene platelets, wherein the horizontal axis represents the wet-type shear force (MPa) and the vertical axis represents the platelet diameter (μm). The relationships are obtained via circulating the NMP solution containing the highly-graphitized graphene in the circulation system 3 for 1 cycle in the circulation system 3 under different values of the wet-type shear force. Refer to Curve D50 in FIG. 3. While the wet-type shear force is not applied, the original average platelet diameter is 28 μm. While the wet-type shear force is increased to 50 MPa, the average platelet diameter decreases to 15 μm. While the wet-type shear force is increased to 200 MPa, the average platelet diameter decreases to 9 μm. FIG. 3 shows that the greater the wet-type shear force, the smaller the average platelet diameter of the obtained graphene platelets. Therefore, the wet-type shear force can indeed separate the highly-graphitized graphene into the graphene platelets.

Embodiment IV

The objective of Embodiment IV is to evaluate the effect of the number of circulation cycles on the platelet diameter of the graphene platelets in the circulation system 3. In Embodiment IV, it is similar to Embodiment III: the highly-graphitized graphene has a graphitization degree of 0.95 and has a length of 100 μm and a width of 100 μm; the fluid is NMP (N-Methyl Pyrrolidone); the concentration of the highly-graphitized graphene is 1 wt %.

Figure 4A:
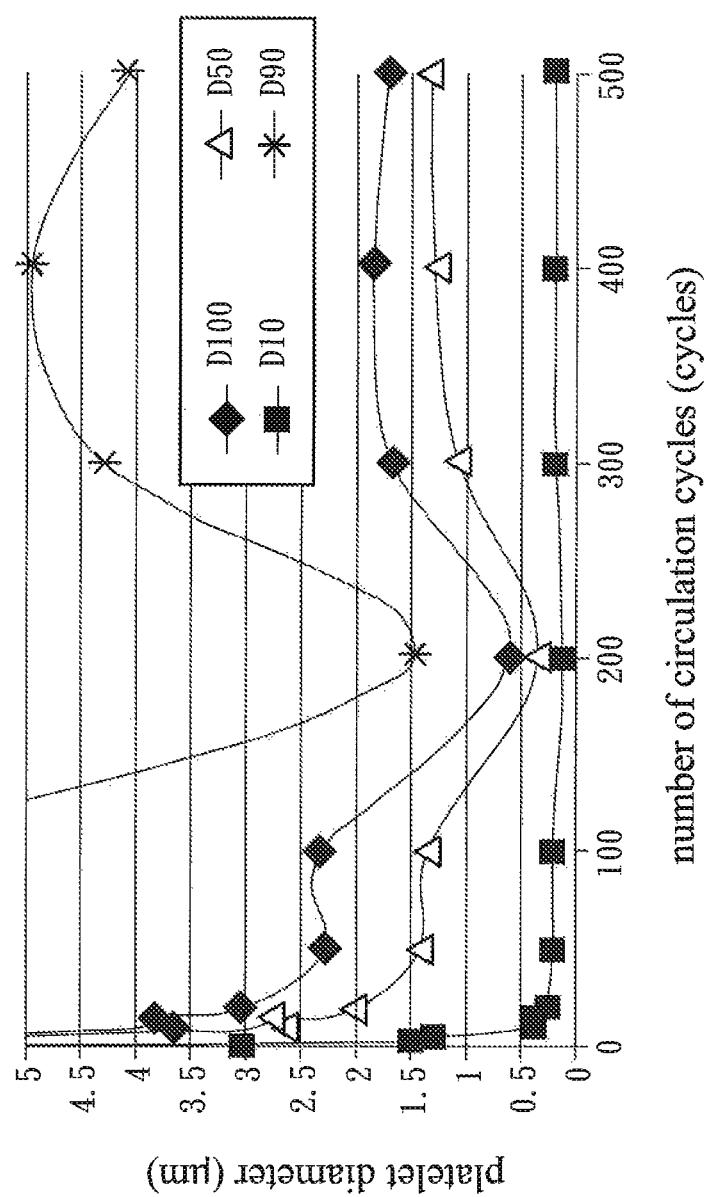
FIG. 4A and FIG. 4B show the results of the analyses of the platelet diameters in Embodiment IV of the present invention.

Refer to FIG. 4A showing the relationships between the number of circulation cycles and the average diameters of the graphene platelets, wherein the horizontal axis represents the number of circulation cycles and the vertical axis represents the platelet diameter (μm). The relationships are obtained via circulating the NMP solution containing the highly-graphitized graphene for 1-500 cycles in the circulation system 3 under a wet-type shear force of 200 MPa. Refer to Curve D50 in FIG. 4A. While the number of circulation cycles has reached 200, the average platelet diameter is 0.4 μm. While the number of circulation cycles exceeds 300, the average platelet diameter increases to 1 μm, however. While the number of circulation cycles exceeds 500, the average platelet diameter further increases to 1.3 μm. It is a hypothesis for such a result: while the number of circulation cycles is increased, the friction between the fluid and the circulation system causes the temperature of the fluid to rise; the temperature rise further causes the re-agglomeration (thermally-induced agglomeration) of the graphene platelets dispersed in the fluid.

Figure 4B:
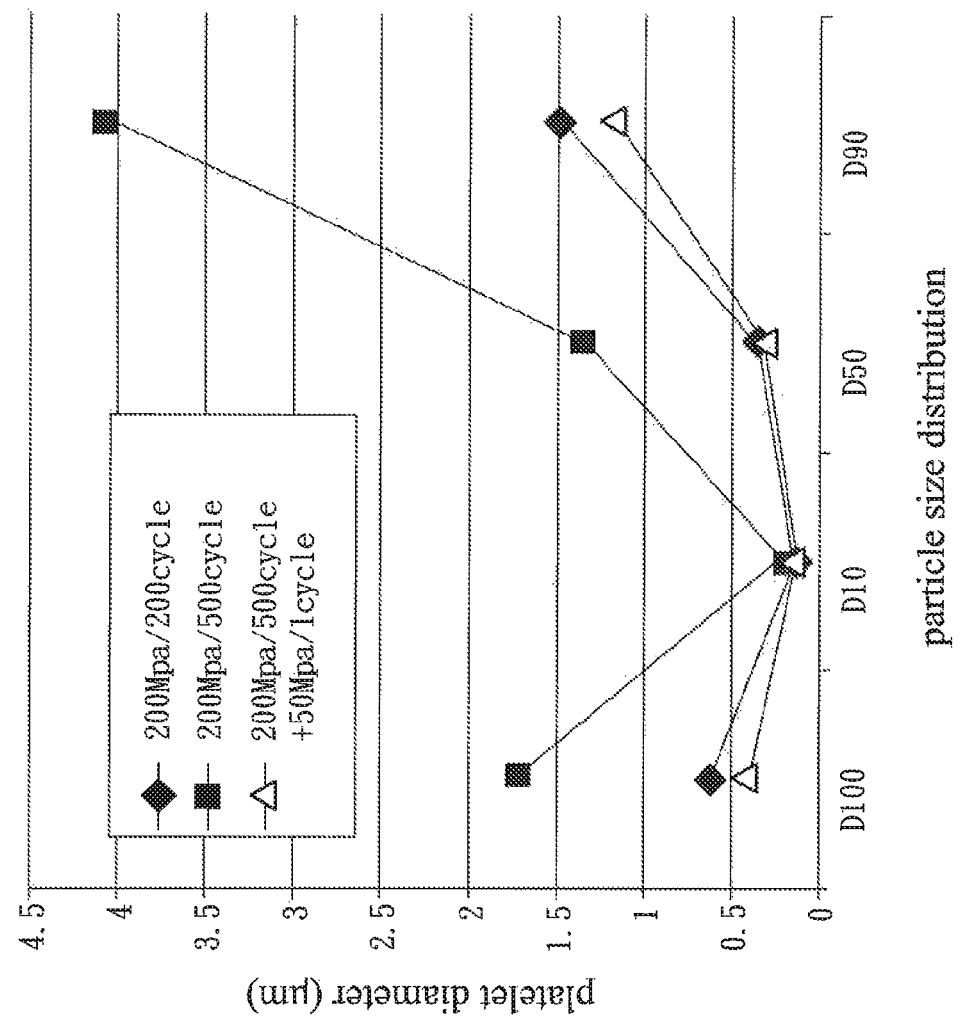

In order to prove the abovementioned hypothesis, the graphene platelets, which are obtained by 500 cycles of circulations under a wet-type shear force of 200 MPa, is further circulated for 1 cycle under a wet-type shear force of 50 MPa to disperse the agglomerated graphene platelets. Refer to FIG. 4B showing the relationships between the number of circulation cycles and the average diameters of the graphene platelets, wherein the horizontal axis represents the particle size distribution and the vertical axis represents the platelet diameter (μm). The fluids are respectively circulated for 200 cycles and 500 cycles under a wet-type shear force of 200 MPa. Then, the fluid, which has been circulated for 500 cycles, is further circulated for 1 cycle under a shear force of 50 MPa (the recirculation process). FIG. 4B shows that the diameter of the graphene platelets of the group of 200 MPa/200 cycles is similar to the diameter of the graphene platelets of the group of [200 MPa/500 cycles+50 MPa/1 cycle] for various grain sizes. The result proves that the graphene platelets indeed re-agglomerate because of the temperature rise of the fluid.

From FIG. 4A and FIG. 4B, the following facts are learned: the average diameter of graphene platelets decreases with the increase of the number of circulation cycles; while the number of circulation cycles exceeds 200, the dispersed graphene platelets re-agglomerate because of the temperature rise of the fluid; a smaller wet-type shear force can be used to re-separate the thermally-agglomerated graphene platelets.

Therefore, it can be concluded from Embodiments III and IV: either of a higher wet-type shear force or a higher number of circulation cycles favors separation of highly-graphitized graphene into graphene platelets; the fluid temperature needs carefully controlling lest the dispersed graphene platelets be thermally agglomerated.

Embodiment V

The present invention is Mainly characterized in applying a shear force to highly-graphitized graphene to overcome the Van der Waals bonding force between the graphene layers and separate the highly-graphitized graphene into graphene platelets. In Embodiment V, before a wet-type shear force is used to separate the highly-graphitized graphene, a pre-treatment is used to swell the highly-graphitized graphene, increasing the interplanar distance ($d_{(0002)}$) between graphene layers and decreasing the Van der Waals bonding force between the graphene layers, whereby the graphene platelets are more easily separated. In Embodiment V, an explosion method is used to realize the pre-treatment, decreasing the Van der Waals bonding force between the graphene layers and favoring the separation of the highly-graphitized graphene.

Figure 5:
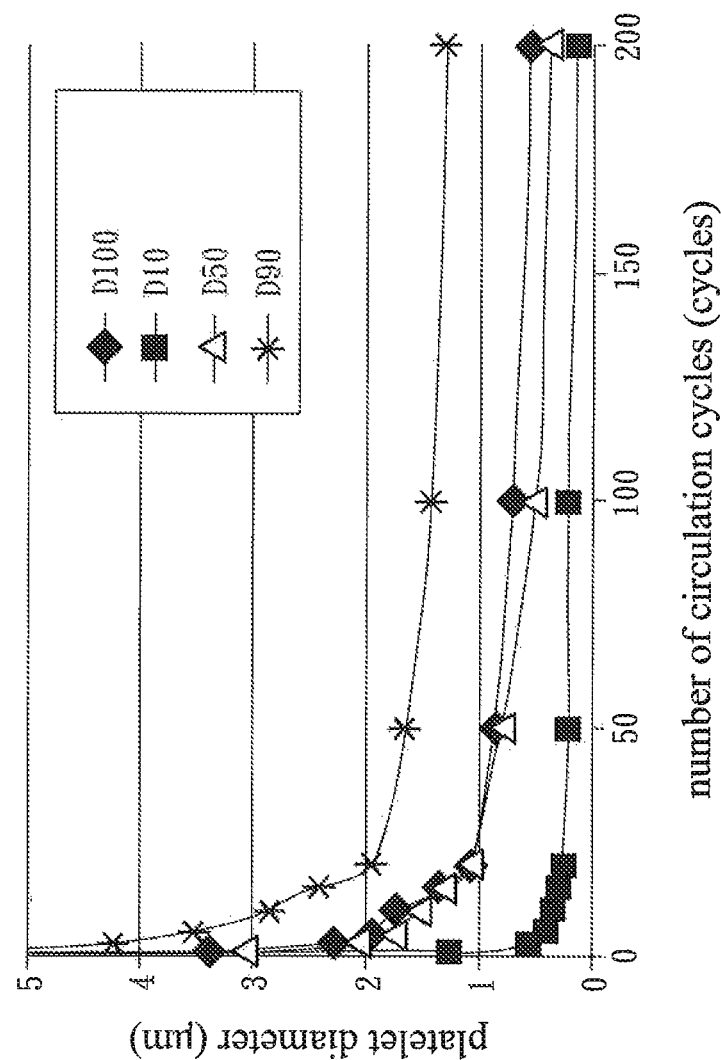
FIG. 5 shows the result of the analysis of the platelet diameters in Embodiment IV of the present invention.

Refer to FIG. 5 showing the analysis of the diameters of graphene platelets, wherein the horizontal axis represents the number of circulation cycles and the vertical axis represents the diameter of the graphene platelets (μm). In Embodiment V, it is similar to Embodiment III: the NMP solution containing the highly-graphitized graphene is circulated in the circulation system 3 for 1-200 cycles under a wet-type shear force of 200 MPa. However, in Embodiment V, it is different Embodiment III: the highly-graphitized graphene is pre-treated with an explosion method beforehand to reduce the Van der Waals bonding force between graphene layers. Refer to Curve D50 in FIG. 5. Curve D50 shows that the average platelet diameter is 0.5 μm while the number of circulation cycles has reached 100 and that the average platelet diameter is 0.4 μm while the number of circulation cycles has reached 200. In comparison with FIG. 4A, it is learned that the 100 cycles of circulations are sufficient to effectively separate the highly-graphitized graphene having been pre-treated by the explosion method. However, no matter whether the highly-graphitized graphene is pre-treated by an explosion method, the separated graphene platelets will have similar sizes as long as the number of circulation cycles has exceeded 100. It indicates that the graphene platelet fabrication method of the present invention can also cooperate with the conventional technology to fast fabricate graphene platelets having a perfect planar hexagonal network structure.

Experiment

Figure 6:
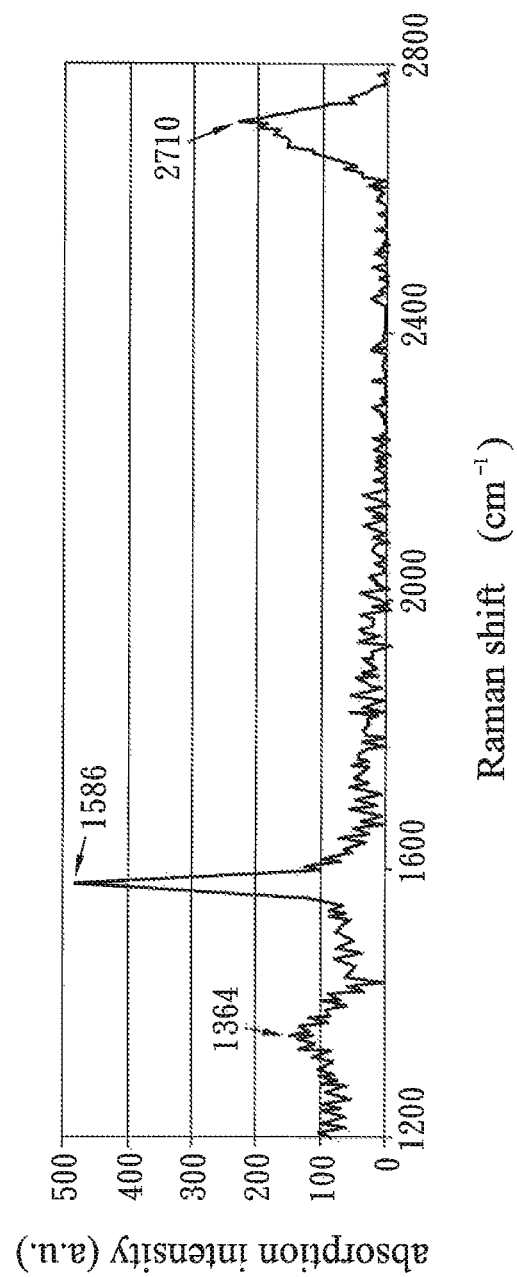
FIG. 6 shows the result of the Raman spectrometric analysis in the experiment of the present invention.

In the present invention, a Raman spectrometer is used to analyze the completeness of the planar structures of the obtained graphene platelets and the number of the layers of the multi-layer structure thereof. The graphene platelets used in the experiment is obtained via circulating the highly-graphitized graphene in the circulation system 3 shown in FIG. 2 for 200 cycles under a wet-type shear force of 200 MPa. Refer to FIG. 6 showing the result of the Raman spectrometric analysis of the abovementioned graphene platelets, wherein the horizontal axis represents the Raman shift ($cm^{-1}$) and the vertical axis represents the absorption intensity (a.u.). The Raman spectrum of the conventional graphene has three characteristic peaks: respectively the D band at 1364 $cm^{-1}$ involved with the $Sp^3$ bonding of carbon atoms; the G band at 1586 $cm^{-1}$ involved with the $Sp^2$ bonding of carbon atoms; and the 2D band at 2710 $cm^{-1}$, which will deviate slightly with the variation of the number of the graphene layers of the graphene platelets. In FIG. 6, the ratio of the intensity of the D band at 1364 $cm^{-1}$ to the intensity of the G band at 1586 $cm^{-1}$ confirms that the graphene platelets fabricated by the method of the present invention has a pretty fine planar hexagonal network structure; the characteristic peak of the 2D band at 2710 $cm^{-1}$ indicates that the multi-layer structure of the graphene platelets has 5 layers of graphene planes. Via an optical microscope, the obtained graphene platelets are detected to have a length of 100 μm and a width of 100 μm, which indicates that the method of the present invention would not damage the planar structure of the graphene platelets.

From Embodiment IV, Embodiment V and the Experiment, it is learned that the wet-type shear force generated by a circulation system containing nozzles can fast separate the highly-graphitized graphene into graphene platelets. Thus is proved that the graphene platelet fabrication method of the present invention can fast fabricate graphene platelets having more perfect planar hexagonal network structure.

The embodiments described above are only to exemplify the present invention but not to limit the scope of the present invention. Any modification or variation according to the spirit of the present invention is to be also included within the scope of the present invention, which is based on the claims stated below.

What is claimed is:

1. A graphene platelet fabrication method comprising the steps of:

Step (A): providing a liquid mixed with a highly-graphitized graphene having a graphitization degree of 0.8-1.0; and Step (B): passing the liquid through a circulation system containing a nozzle to make the liquid act on a surface or a lateral of the highly-graphitized graphene to provide a wet-type shear force acting on the highly-graphitized graphene to separate the highly-graphitized graphene into graphene platelets by a liquid action force opposite to the movement direction of the graphene platelets, wherein the highly-graphitized graphene is passed through elbows to make the liquid action force act on the lateral of the highly-graphitized graphene and separate the highly-graphitized graphene into the graphene platelets, and wherein the graphene platelets have a length of 10-500 μm and a width of 10-500 μm and have a single-layer or multi-layer structure.

2. The graphene platelet fabrication method according to claim 1, wherein the multi-layer structure of the graphene platelets has 2-50 layers of graphene planes.

3. The graphene platelet fabrication method according to claim 1, wherein the wet-type shear force is greater than a bonding force of the graphene platelets.

4. The graphene platelet fabrication method according to claim 1, wherein the liquid is selected from a group consisting of water, NMP (N-Methyl Pyrrolidone), surfactants, salt solutions, and combinations thereof.

5. The graphene platelet fabrication method according to claim 1, wherein the highly-graphitized graphene has a concentration of 0.5-50 wt % in the liquid.

6. The graphene platelet fabrication method according to claim 1, wherein the elbows have an angle of 30-150 degrees.

7. The graphene platelet fabrication method according to claim 1, wherein the highly-graphitized graphene is circulated in the circulation system for 1-900 cycles.

8. The graphene platelet fabrication method according to claim 1, wherein the circulation system applies the wet-type shear force of 1-500 MPa to the highly-graphitized graphene.

9. The graphene platelet fabrication method according to claim 4, wherein the highly-graphitized graphene is circulated in the circulation system for 200 cycles under the wet-type shear force of 200 MPa.

10. The graphene platelet fabrication method according to claim 1, wherein the liquid has a temperature of 25-100° C.

11. The graphene platelet fabrication method according to claim 1, further comprising Step (A1): undertaking a pre-treatment on the highly-graphitized graphene before Step (A) to swell the highly-graphitized graphene.

12. The graphene platelet fabrication method according to claim 6, wherein the pre-treatment is selected from a group consisting of an explosion method, a chemical exfoliation method, an ultrasonic method, a ball milling method, and combinations thereof.

13. A graphene platelet fabricated according to claim 1, wherein the graphene platelet has a length of 10-500 μm and a width of 10-500 μm and has a single-layer structure or a multi-layer structure.

14. The graphene platelet according to claim 8, having 2-50 layers of graphene planes.

* * * * *